US012763909B2

(12) United States Patent
Ji et al.

(10) Patent No.: US 12,763,909 B2
(45) Date of Patent: Oct. 13, 2026

(54) RESOURCE COORDINATION IN DIRECT USER EQUIPMENT TRANSMISSIONS

(71) Applicant: Nokia Technologies OY, Espoo (FI)

(72) Inventors: Lianghai Ji, Aalborg (DK); Vinh Van Phan, Oulu (FI); Ling Yu, Kauniainen (FI); Torsten Wildschek, Gloucester (GB); Nuno Manuel Kiilerich Pratas, Gistrup (DK); Daniel Medina, Munich (DE)

(73) Assignee: Nokia Technologies OY, Espoo (FI)

( * ) Notice: Subject to any disclaimer, the term of this patent is extended or adjusted under 35 U.S.C. 154(b) by 222 days.

(21) Appl. No.: 18/556,764

(22) PCT Filed: Feb. 24, 2022

(86) PCT No.: PCT/EP2022/054661
§ 371 (c)(1),
(2) Date: Oct. 23, 2023

(87) PCT Pub. No.: WO2022/233473
PCT Pub. Date: Nov. 10, 2022

(65) Prior Publication Data
US 2024/0204959 A1 Jun. 20, 2024

(30) Foreign Application Priority Data
May 6, 2021 (FI) ..................................... 20215534

(51) Int. Cl.
*H04L 5/00* (2006.01)
*H04W 72/02* (2009.01)
*H04W 72/40* (2023.01)

(52) U.S. Cl.
CPC ........... *H04L 5/0053* (2013.01); *H04W 72/02* (2013.01); *H04W 72/40* (2023.01)

(58) Field of Classification Search
CPC .... H04L 5/0053; H04W 72/02; H04W 72/40; H04W 72/20; H04W 74/002;
(Continued)

(56) References Cited

U.S. PATENT DOCUMENTS 12,628,127 B2 * 5/2026 Khoryaev ............ H04W 72/02
2020/0186290 A1 6/2020 Zhang et al.
(Continued)

FOREIGN PATENT DOCUMENTS

CN 106804119 A 6/2017
CN 107079473 A 8/2017
(Continued)

OTHER PUBLICATIONS

Examination Report for Indian Application No. 202347081680 dated Apr. 29, 2025 and English translation.
(Continued)

*Primary Examiner* — Schquita D Goodwin
(74) *Attorney, Agent, or Firm* — Harness, Dickey & Pierce, P.L.C.

(57) ABSTRACT

In one embodiment, the user equipment performs generating a coordination request for information on resources for use for direct inter user equipment transmissions, the coordination request including an indication of a preference for resources for receiving a coordination response; monitoring for coordination requests made by at least one other user equipment; generating the resource preference indication in dependence upon at least one preference indication from at least one of the monitored coordination requests.

15 Claims, 4 Drawing Sheets

(58) Field of Classification Search
CPC ......... H04W 84/20; H04W 4/08; H04W 4/46; H04W 72/04; H04W 72/121; H04W 76/14
See application file for complete search history.

(56) References Cited

U.S. PATENT DOCUMENTS

| | | | |
|---|---|---|---|
| 2020/0221307 A1 | 7/2020 | Jeon et al. | |
| 2020/0296762 A1 | 9/2020 | Sun et al. | |
| 2020/0344574 A1 | 10/2020 | Park et al. | |
| 2021/0006318 A1 | 1/2021 | Kim et al. | |
| 2022/0046653 A1* | 2/2022 | Hosseini | H04W 72/56 |
| 2022/0240265 A1* | 7/2022 | Sarkis | H04L 5/0037 |
| 2022/0322359 A1* | 10/2022 | Ye | H04W 72/02 |
| 2023/0239900 A1* | 7/2023 | Park | H04W 4/40 370/329 |
| 2024/0172188 A1* | 5/2024 | Luo | H04W 4/40 |
| 2024/0205942 A1* | 6/2024 | Kim | H04W 72/04 |
| 2024/0224297 A1* | 7/2024 | Shin | H04W 76/14 |
| 2024/0365363 A1* | 10/2024 | Nguyen | H04B 17/328 |

FOREIGN PATENT DOCUMENTS

| | | | |
|---|---|---|---|
| CN | 111225446 | A | 6/2020 |
| CN | 112106326 | A | 12/2020 |
| CN | 112291743 | A | 1/2021 |
| CN | 112333661 | A | 2/2021 |
| CN | 112423273 | A | 2/2021 |
| EP | 3051727 | A1 | 8/2016 |
| EP | 3028484 | B1 | 9/2020 |

OTHER PUBLICATIONS

"Inter-UE Coordination for Mode 2 Resource Allocation," 3GPP TSG RAN WG1, No. #104-e, e-Meeting; Jan. 25-Feb. 5, 2021, R1-210358, pp. 1-8.

"Inter-UE Coordination for Mode 2," 3GPP TSG RAN WG1, No. #104-e, e-Meeting; Jan. 25-Feb. 5, 2021, R1-2100493, pp. 1-5.

Office Communciation for European Application No. 22 712 808.9 dated Nov. 12, 2024.

Nokia et al. R1-2102362. Inter-UE coordination in sidelink resource allocation mode 2. 3GPP TSG RAN WG1 Meeting #104bis, e-Meeting, Apr. 12-20, 2021. [online], Apr. 7, 2021.

LG Electronics. R1-2104103. Feature lead summary for AI 8.11.1.2 Inter-UE coordination for Mode 2 enhancements. 3GPP TSG RAN WG1 Meeting #104bis-e, e-Meeting, Apr. 12-20, 2021. [on line], Apr. 21, 2021.

Garcia, M. et al. A Tutorial on 5G NR V2X Communications. In: IEEE Communications Surveys & Tutorials. IEEE [online], Feb. 3, 2021, vol. 23, No. 3, pp. 1972-2026.

Nokia et al. R1-2104177. Inter-UE coordination in mode 2 sidelink resource allocation. 3GPP TSG RAN WG1 Meeting#105-e, e-meeting, May 10-27, 2021. [online], May 12, 2021, [retrieved on Dec. 10, 2021.] Retrieved from <https://www.3gpp.org/ftp/TSG_RAN_RL1/TSGR1_105-e/Docs/R1-21044177.zip>.

International Search Report and Written Opinion for International Application No. PCT/EP2022/054661 dated Feb. 24, 2022.

Finnish Search Report For Finnish U.S. Appl. No. 20/215,534 dated Dec. 12, 2021.

Finnish Office Action for Finnish Patent Application No. 20215534 dated Aug. 16, 2022.

ZTE Corporation, Sanechips. R2-2009028. "Discussion on sidelink inter-UE coordination". 3GPP TSG-RAN WG2 Meeting #112-e, Nov. 2-13, 2020.

InterDigital Inc.. R2-2009212. "RAN2 Aspects of Resource Allocation with Inter-UE Coordination". 3GPP RAN WG2 Meeting #112 electronic, [online] Nov. 2020.

Office Communication for European Application No. 22 712 808.9 dated Mar. 12, 2025.

3GPP TSG RAM WG1 #104bis-e, R1-210xxxx, e-Meeting, Apr. 12-20, 2021, Title: Feature lead summary for AI 8.11,12 Inter-UE coodination for Mode 2 enhancements, 74 pages.

Chinese Office Action dated Jul. 31, 2026 in corresponding Chinese Application No. 202280032038.X.

* cited by examiner

| Slot | UE-B_1 | UE-B_n | UE-B_2 |
|---|---|---|---|
| 1 | P | NP | NP |
| 2 | NP | P | NP |
| 3 | P | P | NP |
| 4 | P | P | NP |
| 5 | P | P | P |
| 6 | NP | NP | NP |
| 7 | P | P | P |
| 8 | P | P | P |
| 9 | NP | NP | NP |
| 10 | P | P | P |

RESOURCE COORDINATION IN DIRECT USER EQUIPMENT TRANSMISSIONS

CROSS-REFERENCE TO RELATED APPLICATIONS

This application is a national phase under 35 U.S.C. § 371 of PCT International Application No. PCT/EP2022/054661 which has an International filing date of Feb. 24, 2022 which claims priority to Finnish Application No. 20215534 filed May 6, 2021, the entire contents of each of which are hereby incorporated by reference.

TECHNOLOGICAL FIELD

Various example embodiments relate to resource coordination in direct transmissions between user equipment.

BACKGROUND

User equipment (UE) may communicate directly with each other, in some cases using sidelink channels. A potential problem with such communications may arise when there is no central network control of resource allocation as in this case the UE autonomously selects its transmission resource, and there may be resource conflict which can lead to loss of data.

In this regard there is a half-duplex limitation on user equipment which means that user equipment that are transmitting are not listening for an incoming transmission. This potential for resource conflict leads to decreased reliability in direct communications. In some cases one of the user equipment in a group of user equipment that are directly communicating with each other may be designated a coordinating user equipment to coordinate the use of the resources by the other user equipment and thereby reduce the possibility of conflict. However, this coordination has a signalling overhead associated with it which itself may suffer from half-duplex resource conflicts. Thus, it would be desirable if any coordination is managed in a signalling efficient manner.

BRIEF SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to various, but not necessarily all, embodiments of the invention there is provided according to a first aspect an apparatus, comprising means for: generating a coordination request for information on resources for use for direct inter user equipment transmissions, said coordination request including an indication of a preference for resources for receiving a coordination response; monitoring for coordination requests made by at least one other user equipment; generating said resource preference indication in dependence upon at least one preference indication from at least one of said monitored coordination requests.

In some example embodiments, said preference indication comprises an indication of at least one preferred resource and an indication of at least one non-preferred resource.

In some example embodiments, said apparatus comprises: preferentially selecting as a preferred resource a resource that has been indicated as a preferred resource in at least one of said monitored coordination requests.

In some example embodiments, said apparatus comprises: preferentially not selecting as a preferred or a non-preferred resource a resource that has been indicated as a non-preferred resource in at least one of said monitored coordination requests.

In some example embodiments, said apparatus comprises means for: selecting relevant monitored coordination requests; and generating said resource preference indication in dependence upon at least one preference indication from at least one of said selected coordination requests.

In some example embodiments, said monitored coordination requests are selected as being relevant monitored coordination requests in dependence upon an identifier within said request, said identifier of relevant coordination requests indicating that said relevant coordination requests are directed to a same destination as said coordination request being generated.

In some example embodiments, said destination identifier may be an ID of a coordination user equipment coordinating the direct user equipment transmission resources, it may be an identifier of said coordination UE that is used by a group of user equipment to identify that UE, or used it may be an identifier of said coordination UE used by the group of user equipment for coordination requests.

In some example embodiments, at least some of said monitored coordination requests include an indication of a characteristic of data to be transmitted in said inter user equipment direct transmissions, said relevant monitored coordination requests comprise coordination requests with similar data characteristics to said data characteristics of said coordination request being generated.

In some example embodiments, said characteristic of data comprises at least one of a priority of transmission, and a data traffic type.

In some example embodiments, a high priority transmission indicator may contain an indication requiring HARQ feedback.

In some example embodiments, at least some of said monitored coordination requests include a validity time indication indicating a time during which said request or indicated resources are valid, said relevant monitored coordination requests comprise coordination requests where the request or indicated resources are currently valid.

In some example embodiments, said relevant monitored coordination requests comprise coordination requests that have not yet been responded to.

In some example embodiments an apparatus may receive coordination responses for other user equipment within a same group of user equipment and thus, may be aware of what coordination requests have been responded to.

In some example embodiments, said apparatus comprises means for: receiving at least one identifier identifying a destination for at least one of transmitting and receiving said coordination requests; and generating said coordination request using said at least one identifier.

In some example embodiments, said identifier identifies a group of user equipment, said group including a coordination user equipment and said at least one other user equipment.

In some example embodiments, said apparatus comprises means for transmitting said coordination request In some example embodiments, said resources are at least one of a time and frequency resource.

In some example embodiments, said direct inter-user-equipment transmissions comprise transmissions in a side-link channel.

In some example embodiments, said apparatus comprises a user equipment.

According to various, but not necessarily all, embodiments of the invention there is provided according to a second aspect an apparatus, comprising means for: receiving a plurality of coordination requests from a plurality of user equipment, said coordination requests comprising a request for information on resources for use for direct inter-user equipment transmissions and including an indication of a preference of resources for receiving a coordination response; determining from said indication of resource preferences user equipment that have shared preferred or non-preferred resources and grouping at least some of said user equipment with shared preferences together; generating a coordination response by multiplexing coordination responses to user equipment within said group of user equipment together; and transmitting said multiplexed coordination response to said user equipment in said group on a resource selected in dependence upon said shared preferences.

In some example embodiments, the apparatus comprises means for: generating an activation request for transmission to a plurality of user equipment, said activation request indicating that said plurality of user equipment should begin monitoring for coordination requests made by at least one other user equipment and should generate their resource preference indication in dependence upon at least one preference indication from at least one of said monitored coordination requests.

In some example embodiments, the apparatus comprises means for: generating a deactivation request for transmission to a plurality of user equipment, said deactivation request indicating that said plurality of user equipment should stop monitoring for coordination requests made by at least one other user equipment.

In some example embodiments, the apparatus comprises means for: transmitting at least one identifier to a plurality of user equipment, wherein said at least one identifier is for use in said coordination requests and identifies said apparatus as a destination apparatus for said coordination request.

In some example embodiments, said identifier identifies a group of user equipment said group of user equipment comprising said apparatus and said plurality of user equipment.

In some example embodiments, the apparatus comprises means for: determining a length of a time gap before generating said coordination response in dependence upon at least one of: a number of pending coordination requests and a priority of said coordination request.

In some example embodiments, the apparatus comprises a coordinating user equipment for coordinating the resources for use in direct inter-user equipment transmissions.

In some example embodiments, the means comprises: at least one processor; and at least one memory including computer program code, the at least one memory and computer program code being configured to, with the at least one processor, cause the performance of the apparatus.

According to various, but not necessarily all, embodiments of the invention there is provided according to a third aspect a method comprising: monitoring for coordination requests made by at least one other user equipment; generating a coordination request for information on resources for use for direct inter user equipment transmissions, said coordination request including an indication of a preference for resources for receiving a coordination response; wherein said resource preference indication is generated in dependence upon at least one preference indication from at least one of said monitored coordination requests.

In some example embodiments, said preference indication comprises an indication of at least one preferred resource and an indication of at least one non-preferred resource.

In some example embodiments, said method comprises: preferentially selecting as a preferred resource a resource that has been indicated as a preferred resource in at least one of said monitored coordination requests.

In some example embodiments, said method comprises: preferentially not selecting as a preferred or a non-preferred resource a resource that has been indicated as a non-preferred resource in at least one of said monitored coordination requests.

In some example embodiments, said method comprises means for: selecting relevant monitored coordination requests; and generating said resource preference indication in dependence upon at least one preference indication from at least one of said selected coordination requests.

In some example embodiments, said monitored coordination requests are selected as being relevant monitored coordination requests in dependence upon an identifier within said request, said identifier of relevant coordination requests indicating that said relevant coordination requests are directed to a same destination as said coordination request being generated.

In some example embodiments, at least some of said monitored coordination requests include an indication of a characteristic of data to be transmitted in said inter user equipment direct transmissions, said relevant monitored coordination requests comprise coordination requests with similar data characteristics to said data characteristics of said coordination request being generated.

In some example embodiments, at least some of said monitored coordination requests include a validity time indication indicating a time during which said request or indicated resources are valid, relevant monitored coordination requests comprising coordination requests where the request or indicated resources are currently valid.

In some example embodiments, said relevant monitored coordination requests comprise coordination requests that have not yet been responded to.

In some example embodiments, said method comprises receiving at least one identifier identifying a destination for at least one of transmitting and receiving said coordination requests; and generating said coordination request using said at least one identifier.

In some example embodiments, said identifier identifies a group of user equipment, said group including a coordination user equipment and said at least one other user equipment.

In some example embodiments, said method comprises transmitting said coordination request According to various, but not necessarily all, embodiments of the invention there is provided according to a fourth aspect a method comprising: receiving a plurality of coordination requests from a plurality of user equipment, said coordination requests comprising a request for information on resources for use for direct inter-user equipment transmissions and including an indication of a preference of resources for receiving a coordination response; determining from said indication of resource preferences user equipment that have shared preferred or non-preferred resources and grouping at least some of said user equipment with shared preferences together; generating a coordination response by multiplexing coordination responses to user equipment within said group of user equipment together; and transmitting said multiplexed coordination response to said user equipment in said group on a resource selected in dependence upon said shared preferences.

In some example embodiments, the method comprises: generating an activation request for transmission to a plurality of user equipment, said activation request indicating that said plurality of user equipment should begin monitoring for coordination requests made by at least one other user equipment and should generate their resource preference indication in dependence upon at least one preference indication from at least one of said monitored coordination requests.

In some example embodiments, the method comprises: generating a deactivation request for transmission to a plurality of user equipment, said deactivation request indicating that said plurality of user equipment should stop monitoring for coordination requests made by at least one other user equipment.

In some example embodiments, the method comprises transmitting at least one identifier to a plurality of user equipment, wherein said at least one identifier is for use in said coordination requests and identifies said apparatus as a destination apparatus for said coordination request.

In some example embodiments, the method comprises determining a length of a time gap before generating said coordination response in dependence upon at least one of: a number of pending coordination requests and a priority of said coordination request.

In some example embodiments, the means comprises: at least one processor; and at least one memory including computer program code, the at least one memory and computer program code being configured to, with the at least one processor, cause the performance of the apparatus.

According to various, but not necessarily all, embodiments of the invention there is provided according to a fifth aspect a computer program comprising computer executable instructions which when executed by a processor are operable to control said processor to perform a method according to a third or fourth aspect.

According to various, but not necessarily all, embodiments of the invention there is provided according to a sixth aspect an apparatus, comprising coordination request generation circuitry configured to generate a coordination request for information on resources for use for direct inter user equipment transmissions, said coordination request including an indication of a preference for resources for receiving a coordination response; monitoring circuitry configured to monitor for coordination requests made by at least one other user equipment; wherein coordination request generation circuitry is configured to generate said resource preference indication in dependence upon at least one preference indication from at least one of said monitored coordination requests.

In some example embodiments, said coordination request generation circuitry is configured to preferentially select as a preferred resource a resource that has been indicated as a preferred resource in at least one of said monitored coordination requests.

In some example embodiments, said coordination request generation circuitry is configured to preferentially not select as a preferred or a non-preferred resource a resource that has been indicated as a non-preferred resource in at least one of said monitored coordination requests.

In some example embodiments, said monitoring circuitry is configured to select relevant monitored coordination requests; and said coordination request generation circuitry is configured to generate said resource preference indication in dependence upon at least one preference indication from at least one of said selected coordination requests.

In some example embodiments, said apparatus comprises a receiver for receiving at least one identifier identifying a destination for at least one of transmitting and receiving said coordination requests; and said coordination request generation circuitry is configured to generate said coordination request using said at least one identifier.

In some example embodiments, said apparatus comprises a transmitter for transmitting said coordination request According to various, but not necessarily all, embodiments of the invention there is provided an apparatus comprising a receiver configured to receive a plurality of coordination requests from a plurality of user equipment, said coordination requests comprising a request for information on resources for use for direct inter-user equipment transmissions and including an indication of a preference of resources for receiving a coordination response; determining circuitry configured to determine from said indication of resource preferences user equipment that have shared preferred or non-preferred resources and grouping at least some of said user equipment with shared preferences together; and coordination response generating circuitry configured to multiplex coordination responses to user equipment within said group of user equipment together; and a transmitter configured to transmit said multiplexed coordination response to said user equipment in said group on a resource selected in dependence upon said shared preferences.

In some example embodiments, said apparatus comprises activation/deactivation request generating circuitry configured to generate an activation request for transmission to a plurality of user equipment, said activation request indicating that said plurality of user equipment should begin monitoring for coordination requests made by at least one other user equipment and should generate their resource preference indication in dependence upon at least one preference indication from at least one of said monitored coordination requests and to generate a deactivation request for transmission to a plurality of user equipment, said deactivation request indicating that said plurality of user equipment should stop monitoring for coordination requests made by at least one other user equipment.

In some example embodiments, said apparatus comprises a transmitter for transmitting at least one identifier to a plurality of user equipment, wherein said at least one identifier is for use in said coordination requests and identifies said apparatus as a destination apparatus for said coordination request.

According to various, but not necessarily all, embodiments of the invention there is provided a system comprising a plurality of apparatus according to a first aspect and an apparatus according to a second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Figure 1:
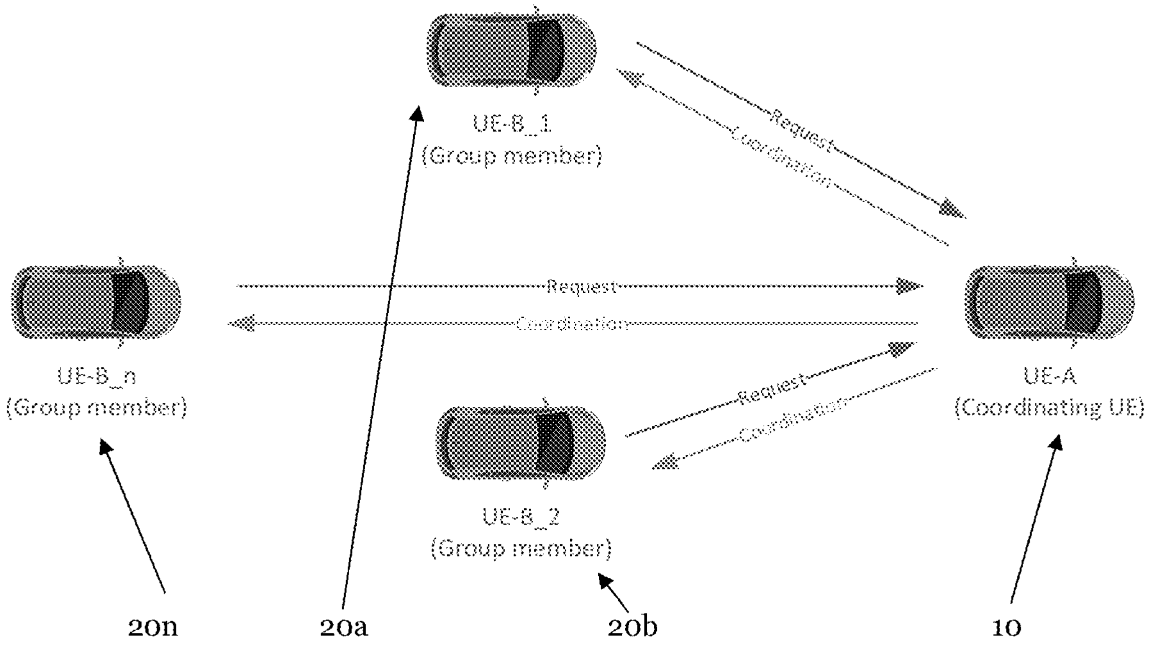
FIG. 1 illustrates a group of apparatus communicating directly with each other, one apparatus acting to coordinate resources.

Before discussing the example embodiments in any more detail, first an overview will be provided.

Where UE's transmit signals directly to each other rather than via a base station, for example using a sidelink channel, they are doing so in a half-duplex mode such that when transmitting they cannot receive messages and thus, there is a risk that messages sent to a UE may not be received by it. This problem may become acute where there are many UEs using the same resources and may be addressed by making one of the UEs within this group of UEs a coordinating UE, UE-A, which can coordinate the use of the shared direct transmission resources by other UEs, UE-Bs, by transmitting information to the UE-Bs indicating sets of resources that they should use. This can significantly reduce the half-duplex problems.

The UE-Bs may request this coordination information and in some cases they may include in the coordination request, information regarding preferred and/or non-preferred resources to receive the coordination response on. The preferred resources are those where the UE expects to be available to receive the coordination response and the non-preferred resources are those where the UE expects not to be available, perhaps a resource on which they are scheduled to transmit another signal. Where a UE-B has requested coordination information it is important that it is received and providing preferred and/or non-preferred resource information in the request can help.

Example embodiments propose a signalling-efficient procedure to address the half-duplex issues at UE-B(s) and UE-A for receiving and sending coordination message(s), respectively.

In example embodiments, user equipment UE-B requesting the coordination information monitors for requests sent to the coordinating UE, UE-A, by other UE-Bs. They may then utilize the resource information within these monitored requests to influence the resource information that they themselves supply to the coordinating UE, UE-A. In this regard, where a preferred resource of one UE within the group is also a preferred resource of that UE then they will preferentially select this as at least one of the indicated preferred resources. Where there are non-preferred resources detected then they may preferentially choose not to select that resource as a resource to be indicated, as the coordinating UE will already be disinclined to use that resource, and indicating a further non-preferred resource may be more helpful. This process increases the likelihood that resources that are likely to be suitable for more than one UE-B are identified and allows the coordinating UE-A to select such a resource and multiplex responses to multiple UE-Bs into a single multiplexed response to be transmitted on this resource, thereby improving the signalling efficiency of the process without reducing reliability.

The coordinating UE, UE-A, selects UE-Bs that have requested coordination and that have similar preferred resources and multiplexes the responses to these UEs together. The multiplexed response is then sent on the shared preferred resource such that a single resource is used to transmit multiple responses in the form of a single multiplexed response.

FIG. 1 illustrates a potential scenario where embodiments may be particularly useful. FIG. 1 shows a group of vehicles that are close to each other in a platoon for example and that transmit signals directly to each other using sidelink channels. In this example these signals may be used in the control of driverless vehicles. In order to reduce the problem of signals not being received due to the half-duplex problem, one of the UEs 10, perhaps the platoon leader, may be designated as a coordinating UE, UE-A. Coordinating UE 10, UE-A, receives coordination requests from other UEs, UE-Bs 20, within the group and responds with coordination information indicating sets of resources that may be used by those UEs. In order to reduce the chances of the coordination response not being received, the request may contain an indication of preferred and/or non-preferred resources for the response to be sent on, and for some of the UE-Bs the preferences indicated may be influenced by the detected preferences indicated by other UE-Bs. The steps performed in this process are set out in FIG. 2 and detailed below.

Figure 2:
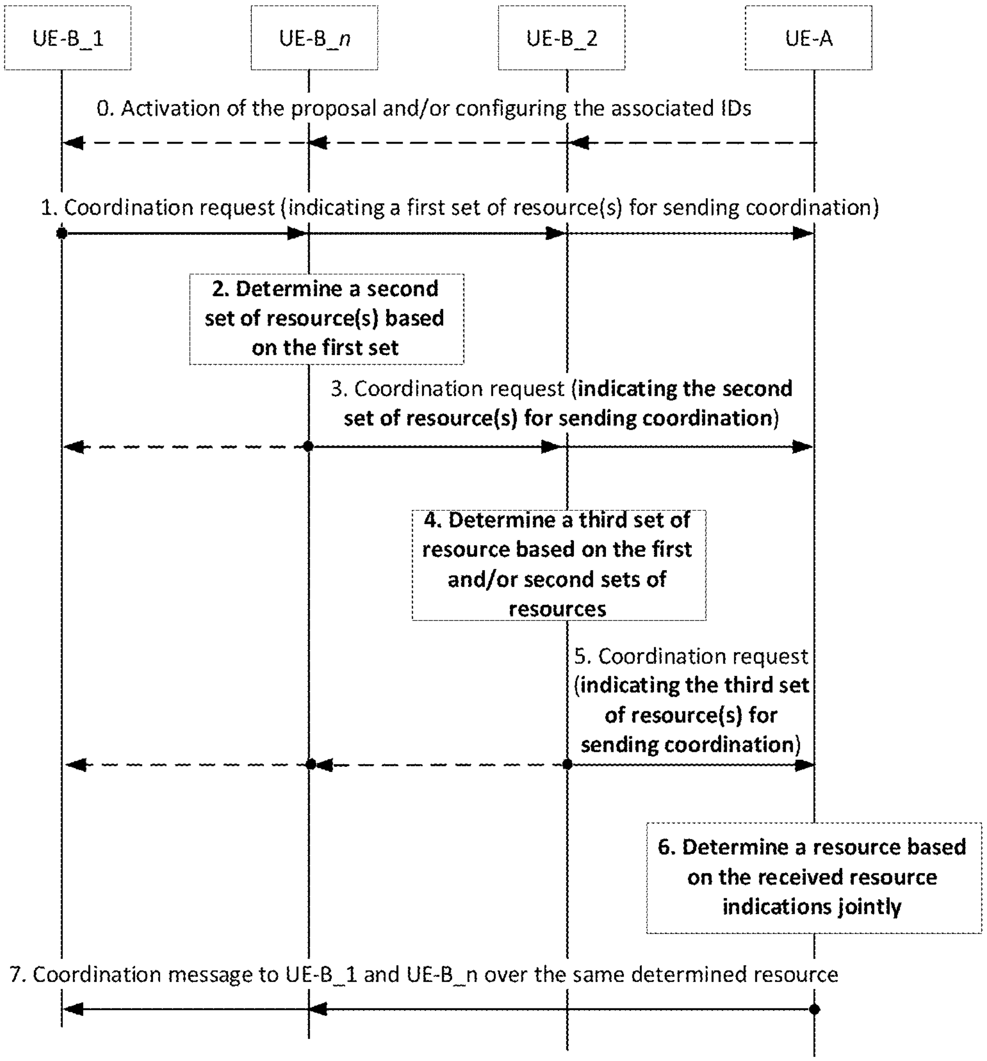
FIG. 2 illustrates a flow diagram showing steps in a method according to an embodiment.

FIG. 2 shows a flow chart illustrating steps in a method according to an embodiment. FIG. 2 shows a first step 0 where the coordinating UE, UE-A 10 in FIG. 1, transmits an activation signal indicating to the UE-Bs that when sending their requests there should be some coordination between UE-Bs when indicating preferred and/or non-preferred resources. This activation step may also involve configuring the other UEs, UE-Bs 20, within the group and is described in more detail below.

Step 0 may be optional, and the first step may be Step 1, which involves the transmission of a first coordination request from a first UE, UE-B_1. The coordination request includes an indication of a first set of non-preferred/preferred time resource(s) for UE-A to send a coordination message to it. A further UE-B_n may be monitoring for coordination request messages with the configured destination ID for UE-A and may detect the first coordination request from UE-B_1.

The further UE-B_n will take account of this coordination request when generating its own coordination request and in particular, when selecting its preferred and/or non-preferred resources. Thus, UE-B_n will generate and send a further coordination request to UE-A and optionally also to other UE-B(s), and will indicate a second set of non-preferred/preferred time resource(s) for UE-A to send a coordination message to it on, wherein the second set of non-preferred/preferred time resource(s) is determined based on the first set of non-preferred/preferred time resource(s).

As one example, the second UE-B_n prioritizes or deprioritizes to include a considered time resource from the first set into its second set of time resource(s), if the considered time resource is also a preferred or non-preferred time source for the second UE-B (UE-B_n), respectively. That is UE-B_n preferentially selects preferred time resources that are in the first set, if they are preferred for itself, and preferentially does not select as either a preferred or non-preferred time resource those that are non-preferred in the first set. When indicating a non-preferred time resource, where it has already been indicated as such in the first set, UE-A will seek not to select the resource and thus, indicating it again does not bring much benefit. Similarly, although a non-preferred resource in the first set may be a preferred resource of UE-B_n, UE-A will seek not to select this resource so there is little merit in indicating it as a preferred resource.

Based on the received first and second resource sets, UE-A determines a time resource with the possibility to multiplex multiple (e.g. two in this example) coordination messages for different UE-Bs (e.g. UE-B_1 and UE-B_n in this section) into one coordination message and transmits the multiplexed coordination message to multiple UE-Bs (e.g. two in this section).

In order for UE-A to determine the preferred resource which in this embodiment is a time resource, the UE-A may:

- perform an intersection operation (i.e. ∩) over the preferred time resources from the two received resource sets. And UE-A may use a time resource from the intersection to transmit the multiplexed coordination message.
- perform a union operation (i.e. U) over the non-preferred time resources from the two received resource sets. And UE-A may use a time resource outside the union to transmit the multiplexed coordination message.

Accordingly, this embodiment enables each UE-B to efficiently and flexibly indicate their preferred/non-preferred time resources for receiving the coordination message, in order to avoid or at least reduce the half-duplex issue. At the same time, the embodiment also enables UE-A to multiplex and transmit the coordination messages of different UE-Bs in a reduced number of resources in this case sidelink SL slots, which mitigates the half-duplex issue at UE-A.

Returning to the optional step, step 0, the group members involved in the inter-UE coordination procedure UE-Bs may be configured and/or activated for using the proposed solution.

In one embodiment, UE-A may dynamically (de-)activate the procedure by sending an indication to the group. As one example, if UE-A foresees a potential half-duplex problem to send the coordination messages, e.g. due to a large number of UE-Bs in the group and/or an intensive SL reception task(s) of its own, UE-A may decide to activate the procedure to increase the likelihood that the coordination message will be received.

In one embodiment, the group members may be further configured with the identifier(s) (ID(s)) used in the inter-UE coordination procedure. The configuration of ID(s) may be performed by, e.g. upper layer, a signalling message in the group (e.g. from the group leader, a UE-A, or from a UE-B), using a configured offset w.r.t. the ID used for data groupcast, network, and/or specs.

In one embodiment, the group members may be further configured with a serial order indicating an order in time for sending their coordination requests. For example, UE-B_n may be configured to send its coordination request after UE-B_1 and UE-B_2 may be configured to send its coordination request after UE-B_1 and U-B_n. Alternatively, the group members, UE-Bs, may be configured to monitor for coordination requests from each other for a random period of time within a preconfigured time interval, starting from the instance when individual UE-Bs detect (or determine) a need/trigger for inter-UE coordination (i.e., coordination information from UE-A), before generating and sending their own coordination requests.

Upon detecting the need/trigger for inter-UE coordination, step 1 is performed and UE-B_1 sends its coordination request message to UE-A, which indicates a first set of time resource(s), which are preferred/non-preferred by UE-B_1 for receiving the coordination message from UE-A. A UE-B may derive its preferred/non-preferred time resources in a number of ways and in one simple example, a UE-B may consider a time resource, where it will perform a SL transmission, as a non-preferred resource, since it may cause a half-duplex issue if the UE-B has to receive the coordination message in the same time slot. As another example, a time resource, which may cause no half-duplex issue and/or experience less interference, may be considered as a preferred time resource. The coordination request message may be monitored by other UE-B(s), e.g. the UE-B(s) with the same coordinating UE-A. In order to do that, the other UE-B(s) may need to know the ID(s), e.g. layer-2 (L2)/layer-1 (L1) ID(s), used for transmitting/receiving the coordination request message, wherein the ID(s) may be configured in step 0.

In one example embodiment, a coordination request message from a UE-B may be groupcast to the group.

i. In one approach, the coordination request message may be sent to the same destination ID (e.g. denoted as ID-1) as the normal data groupcast in the group. In this case, the destination ID used for sending the coordination message may be known by all group members, e.g. upon group formation.
   1. The request may further contain an identifier, e.g. by using a Medium Access Control (MAC) control element (CE) and/or a MAC logical channel (LCH) ID, to identify the message as a request message and/or the corresponding UE-A.

ii. In one approach, the request message may be sent to a destination ID (e.g. denoted as ID-2) different from that used for normal data groupcast (i.e. ID-1). In this case, only the group member(s) acting as UE-A/UE-B in the considered inter-UE coordination procedure would need to monitor the transmission using the destination ID (i.e. ID-2). In this case, those UE members of the group which are release 16 UEs will not monitor the SL communication with ID-2.
   1. If there are multiple potential UE-As in the group, different destination IDs (e.g. ID-2 and ID-3) or different MAC CEs can be used for different UE-As.
   2. The MAC CE/destination ID (e.g. ID-2 and/or ID-3) is known by the UE-Bs with the same coordinating UE-A, e.g. UE-B_1, UE-B_n, and UE-B_2 in FIG. 1.

In another embodiment, a coordination request message from a UE-B may be unicast to the UE-A.

i. The ID(s) used for transmitting/receiving the unicast request message may be configured to the other UE-Bs with the same coordinating UE-A, e.g. by the UE-A.

In another embodiment, a coordination request message from a UE-B may be broadcast, e.g. to a common/default destination ID configured by NW(network)/pre-configuration/specs, where it may further contain the identity of the corresponding UE-A, e.g. by using MAC CE (medium access control control element) for pointing to the ID of UE-A. Thus, every UE-B knowing the common/default destination ID and the corresponding MAC CE can monitor the request message from other UE-Bs.

In another embodiment, a coordination request message may indicate or associate to a validity timer, wherein the validity timer indicates the time duration, when the indicated non-preferred/preferred resources and/or the coordination request can be considered as valid.

When UE-B_n is triggered for requesting inter-UE coordination at step 2, it determines a second set of time resource(s), which are preferred/non-preferred by UE-B_n to receive the coordination message from UE-A, wherein the second set of time resource(s) is determined based on the time resource(s) indicated in the received first set(s).

It is noted that there may be multiple UE-Bs (e.g. UE-B_1, UE-B_3, UE-B_4) having indicated their first sets of time resource(s), though we only show UE-B_1 in FIG. 2. It is noted that it is not necessary for UE-B_n to receive all the request messages correctly and, thus, receiving a coordination request from another UE-B may be a best-effort action at UE-B_n. In one example, UE-B_n may have only received the requests from UE-B_1 and UE-B_3. Thus, UE-B_n may not consider the non-preferred/preferred resources from UE-B_2 for determining UE-B_n's second set of time resource(s). However, if any of UE-B_1 and UE-B_3 has received the non-preferred/preferred resources from UE-B_2, their non-preferred/preferred resources may reflect the non-preferred/preferred resources from UE-B_2 to some extent already. In FIG. 2, if UE-B_n did not receive the request from UE-B_1, it may select its own resources without considering the first set of time resource(s) of UE-B_1.

In case there are multiple coordinating UEs (i.e. UE-As) in the group, UE-B_n may consider the first set of resources from another UE-B to determine its second set of time resource(s), if at least one of the following conditions is fulfilled:

i. UE-B_n may only consider another UE-B with the same coordinating UE-A;
ii. If a coordination request message and/or the indicated resources associates to a validity timer, UE-B_n may only consider another UE-B, if the indicated resources and/or the request from that UE-B is still valid;
iii. UE-B_n may only consider the first sets of resource(s) indicated in the request message(s) from another UE-B, if the UE-A has not provided a coordination message for that request message(s) yet.

In order to determine which first set of resources and/or which request messages should be considered to determine the second set of resources, UE-B_n may also consider the characteristics of the data that is to be transmitted by using the coordination message from UE-A, e.g. considering the request message(s) indicating similar priority values and/or same data traffic type (e.g. aperiodic/periodic data). For instance, a request message may further indicate the priority of the data to be transmitted by using the coordination message from UE-A, in order for UE-A to properly determine the resource set which is to be contained in the coordination message. In this case, as one example, a high priority indicated in the request message may trigger UE-A to send the coordination message with HARQ-feedback-enabled to the requesting UE-B, in order to ensure a good reliability for delivering the coordination message. Thus, UE-B_n may only consider the request message(s) from another UE-B(s) indicating similar priority values, such that the coordination messages from UE-A to UE-B_n and the other UE-B(s) may be multiplexed into one single message with the same HARQ feedback mode.

Determining the second set of resources may depend on the type of indicated resources (e.g. preferred resource or non-preferred resource) in the request message. E.g.:

i. If preferred resources are indicated from UE-B_n to UE-A, UE-B_n may prioritize to include the same preferred resource(s) as those indicated in the received first set(s). For example, if UE-B_1 indicates 3 preferred time resources in its request message, UE-B_n would prioritize to include the same time resource(s) if that is also preferred for itself. In addition, UE-B_n may only consider to include another time resource if one or more of the 3 time resources indicated by UE-B_1 is not preferred for UE-B_n.
ii. If non-preferred resources are indicated from UE-B_n to UE-A, UE-B_n may deprioritize to include the same non-preferred resource(s) as those indicated in the received first set(s). For example, if UE-B_1 indicates 3 non-preferred time resources in its request message, UE-B_n may not need to include the 3 time resource(s) if those resources are also non-preferred for itself. Thus, UE-B_n may consider to include another time resource if that time resource is not preferred for UE-B_n but not indicated by UE-B_1 as UE-B_1's non-preferred resource.
iii. In one embodiment, in addition to or instead of sending the second set of time resources, if UE-B_n determines to indicate the same time resources as that carried in at least one received request message from a particular UE-B (e.g. UE-B_1), UE-B_n may send an indicator in its own request message, wherein the indicator (e.g. UE ID of UE-B_1) points to that request message and/or that particular UE-B, to reduce signalling overhead. In this case, once UE-A receives the request from UE-B_n, it knows that the time resources indicated by UE-B_1 are also applicable for UE-B_n.

In one embodiment, UE-B_n may consider the complementary resource set of UE-B_1's indicated preferred resource set as UE-B_1's non-preferred resource set, and vice versa.

At step 3 UE-B_n sends its coordination request message to UE-A, where the request message indicates the determined second set of time resource(s).

At step 4 UE-B_2 performs the same behaviour as UE-B_n in step 2, wherein it determines a third set of time resource(s) based on its received first and/or second set of time resource(s).

At step 5 UE-B_2 performs the same behaviour as UE-B_n in step 3, i.e. sending a coordination request to UE-A and indicating the determined third set of time resource(s).

At step 6 UE-A determines a time resource, e.g. a SL slot, and the corresponding UE-Bs, whose coordination messages are preferred to be sent in the determined time resource, based on the received resource sets from UE-Bs' coordination requests. The determined time resource will be used by UE-A to transmit the multiplexed coordination messages of the determined UE-Bs.

If preferred resources are indicated from multiple considered UE-Bs to UE-A, UE-A may perform an intersection operation of the considered UE-Bs' indicated resources to determine a time slot, which is preferred by the considered UE-Bs for receiving the multiplexed coordination message from UE-A.

i. If the intersection of the UE-B's indicated resources is empty, then the UE-A can partition the UE-Bs in different groups, with the aim of minimizing the number of coordination messages transmitted from UE-A.

If non-preferred resources are indicated from multiple considered UE-Bs to UE-A, UE-A may perform a union operation to determine a time slot, that is non-preferred by at least one of the considered UE-Bs for receiving the multiplexed coordination message. In this case, UE-A may use a slot outside the union to send the multiplexed coordination message.

i. If the union of the non-preferred resources is such that the amount of non-preferred resources is above a configured threshold, then the UE-A can partition the UE-Bs into different groups, where it then can have more flexibility on the selection of the resource to transmit the coordination message to the UE-Bs in each group. The number of groups is selected with the aim of minimizing the number of coordination messages transmitted from UE-A.

At step 7, based on the determined time resource and the determined corresponding UE-Bs in step 6, UE-A may multiplex the coordination messages of the determined UE-Bs and transmit the multiplexed coordination message in the determined time resource.

The multiplexed coordination message may be groupcast by using the same or different destination ID as the data transmission and/or the request message, wherein the multiplexed coordination message may further contain, e.g. one or multiple MAC CE(s)/SCI IEs indicating different UE-Bs and the corresponding coordination information.

i. If the coordination message is HARQ-feedback-enabled, a destination ID different from normal data groupcast may be used, which ensures only the Release 17 UE-Bs in the group would send their HARQ feedbacks, but not Release 16 UE-Bs in the group.

Additionally or alternatively, only the UE-Bs intended to receive the multiplexed coordination message may need to send their HARQ feedbacks.

UE-A may only check HARQ feedbacks from the intended UE-Bs, e.g. in case the coordination message is groupcast with dedicated-feedback-enabled HARQ.

In one embodiment, though the UE-Bs indicate only time resource(s) in their request messages to UE-A, in other scenarios the UE-Bs may indicate both time-and-frequency resource(s) in their request messages.

Figure 3:
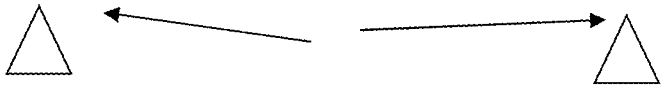
FIG. 3 shows a table schematically illustrating resource preferences.

An example is shown in the table of FIG. 3. In this table "P" indicates that the considered slot is preferred for the considered UE-B to receive the coordination message, while "NP" indicates a non-preferred time resource. In addition, it is assumed that each UE-B may select and indicate up to N=3 time resources from 10 time resources as the preferred resources to UE-A. It is noted that N should not be too large, since that may introduce additional signalling overhead. After UE-B indicates a preferred time resource to UE-A for receiving the coordination message, UE-B reserves the indicated resource and makes sure that the indicated time resource will not be used for UE-B's transmission since the coordination message may be transmitted by UE-A in that time resource (i.e., to avoid or at least reduce the half-duplex issue at UE-B). That means, if N is large, there may be fewer time resources available for use by the UE-B for transmitting data, e.g. aperiodic or event-triggered data.

In the considered example:

1. UE-B_1 may indicate slots 1, 3 and 4 as the preferred slots. This corresponds to step 1 of FIG. 2.
2. After receiving UE-B_1's preferred slots, UE-B_n prioritizes to include the same time slots 3 and 4 as the preferred resources. In addition, it may indicate slot 2 as another preferred resource since slot 1 is not preferred by UE-B_n.
3. After receiving UE-B_1's and/or UE-B_n's preferred slots, UE-B_2 knows none of those slots is preferred for itself. Thus, it indicates slots 5, 7, and 8 as its own preferred resources.
4. Based on the indicated resources from UE-B_1, UE-B_n and UE-B_2, UE-A may determine to transmit the multiplexed coordination message to UE-B_1 and UE-B_n in slot 3 or 4, while another coordination message to UE-B_2 in slot 5, 7, or 8.

a. If UE-A determines one of the slots 3 and 4 is not preferred for itself, e.g. it has been scheduled for another transmission or reception in that slot, it can select the other slot to transmit the coordination message to UE-B_1 and UE-B_n.

The proposed signalling-efficient scheme enables a better chance for UE-A to multiplex multiple coordination messages of UE-Bs, which reduces the number of SL slot used by UE-A for transmitting the coordination messages and, thus, it reduces the half-duplex issue at UE-A. In addition, the coordination messages for UE-Bs can be transmitted by UE-A in UE-Bs' preferred time slot(s), which reduce the half-duplex issue at UE-Bs as well.

Figure 4:
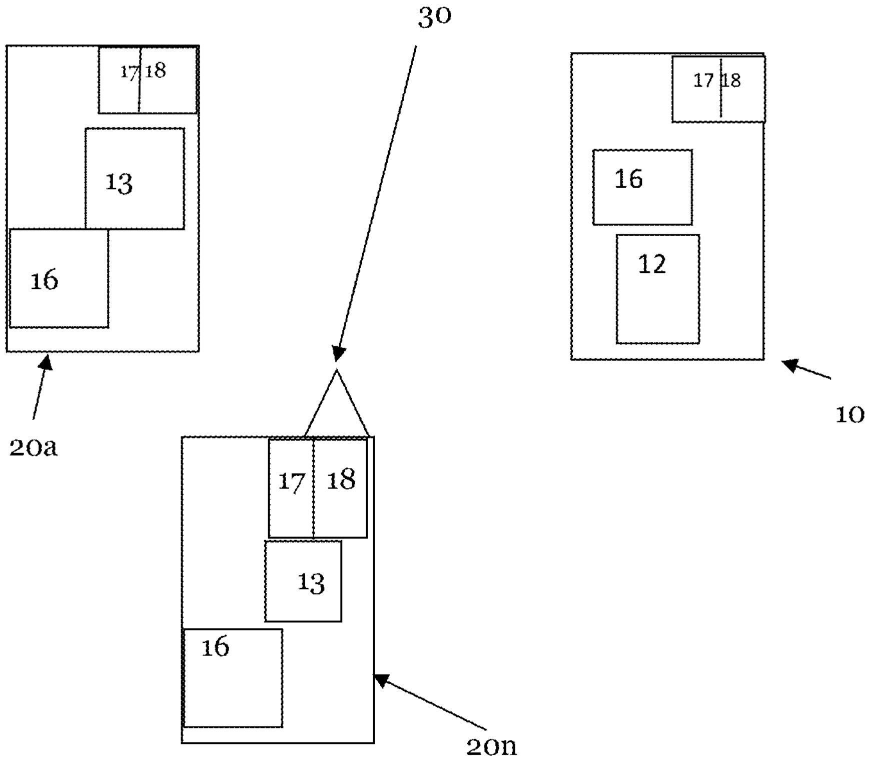
FIG. 4 shows a diagram schematically illustrating the apparatus of embodiments.

FIG. 4 schematically shows the user equipment of embodiments and the circuitry within them. The coordinating UE-A 10 and receiving UEs 20*a* . . . 20*n* each comprise antenna 30 and transmitting 17 and receiving circuitry 18 for transmitting and receiving signals along with processing circuitry 16.

The coordinating UE-A 10 receives requests for resource coordinating information from the UE-Bs 20*a* . . . 20*n* at receiving circuitry 18. It determines from these requests using processing circuitry 16, what resources it should use to respond to these requests. In this regard the received responses include an indication of preferred and/or non-preferred resources. Processing circuitry 16 groups the requests from UE-Bs 20*a* . . . 20*n* together that have shared preferred and/or non preferred resources. Processing circuitry 16 may also consider the characteristics of the data that is to be transmitted by the UE-B requesting the resource, and the priority of that transmission when grouping the requests from the UE-Bs together, UE-Bs with similar data characteristics and/or priorities being grouped together. Coordination response generating circuitry 12 within UE-A 10 generates coordination responses to these requests and multiplexes the generated coordination responses to the user equipment that have been grouped together. Transmitting circuitry 17 then transmits the multiplexed responses to the user equipment in the group.

The UE-Bs 20*a* . . . 20*n* each generate coordination requests for transmitting to the UE-A using coordination request generating circuitry 13. They monitor for and receive coordination requests made by other UE-Bs directed to the same UE-A at receiving circuitry 18. They may do this by monitoring for requests with a particular identifier indicating that the request is for UE-A 10. Processing circuitry 13 determines from the received requests the preferred and/or non-preferred resources for receiving a coordination response of that UE-B and provides an indication of its own preferred/non-preferred resources for including in its coordination request in dependence upon these preferences using the process set out in FIG. 2. Coordination request generating circuitry 13 then generates a coordination request that comprises these preferences and transmitting circuitry 17 outputs the request for transmission to UE-A 10. The coordination request may also be transmitted to some others of the UE-Bs that may themselves select their preferences in dependence upon the preferences indicated in that request.

Receiving circuitry 18 may in time receive a response to the coordination request and may select one or more resources to use for one or more transmissions based on this response. The response it receives may be a multiplexed response including information for other UE-Bs. In this case the UE-B will demultiplex the response and extract the resources relevant to it.

Although the circuitry in the two user equipment are shown differently it should be understood that the user equipment may be substantially the same user equipment configured according to the current circumstances to operate differently.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:

at least one processor; and at least one memory including computer program code; the at least one memory and computer program code being configured to, with the at least one processor, cause the apparatus to, generate a coordination request for information on resources for use for direct inter user equipment transmissions, said coordination request including an indication of a preference for resources for receiving a coordination response;

monitor for coordination requests made by at least one other user equipment; and generate said resource preference indication in dependence upon at least one preference indication from at least one of said monitored coordination requests.

2. An apparatus according to claim 1, wherein said preference indication comprises at least one of an indication of at least one preferred resource and an indication of at least one non-preferred resource.

3. An apparatus according to claim 1, comprising at least one of:

preferentially selecting as a preferred resource a resource that has been indicated as a preferred resource in at least one of said monitored coordination requests; and preferentially not selecting as a preferred or a non-preferred resource a resource that has been indicated as a non-preferred resource in at least one of said monitored coordination requests.

4. An apparatus according to claim 1, wherein the at least one processor and the at least one memory including computer program code, are further configured to, cause the apparatus to:

select relevant monitored coordination requests; and generate said resource preference indication in dependence upon at least one preference indication from at least one of said selected coordination requests.

5. An apparatus according to claim 4, wherein said monitored coordination requests are selected as being relevant monitored coordination requests in dependence upon an identifier within said request, said identifier of relevant coordination requests indicating that said relevant coordination requests are directed to a same destination as said coordination request being generated.

6. An apparatus according to claim 4, wherein at least some of said monitored coordination requests include an indication of a characteristic of data to be transmitted in said inter user equipment direct transmissions, said monitored coordination requests with similar data characteristics to said data characteristics of said coordination request being generated being selected as being relevant coordination requests.

7. An apparatus according to claim 4, wherein at least some of said monitored coordination requests include a validity time indication indicating a time during which said request or indicated resources are valid, said monitored coordination requests where the request or indicated resources are currently valid being selected as being relevant coordination requests.

8. An apparatus according to claim 4, wherein said monitored coordination requests selected as relevant monitored coordination requests being coordination requests that have not yet been responded to.

9. An apparatus according to claim 1, wherein the at least one processor and the at least one memory including computer program code, are further configured to, cause the apparatus to:

receive at least one identifier identifying a destination for at least one of transmitting and receiving said coordination requests; and generate said coordination request using said at least one identifier.

10. A method, comprising:

monitoring for coordination requests made by at least one other user equipment; and generating a coordination request for information on resources for use for direct inter user equipment transmissions, said coordination request including an indication of a preference for resources for receiving a coordination response;

wherein said resource preference indication is generated in dependence upon at least one preference indication from at least one of said monitored coordination requests.

11. A method according to claim 10, wherein said preference indication comprises an indication of at least one preferred resource and an indication of at least one non-preferred resource.

12. A method according to claim 10, wherein said method comprises at least one of:

preferentially selecting as a preferred resource a resource that has been indicated as a preferred resource in at least one of said monitored coordination requests; and preferentially not selecting as a preferred or a non-preferred resource a resource that has been indicated as a non-preferred resource in at least one of said monitored coordination requests.

13. A method according to claim 10, wherein said method comprises selecting relevant monitored coordination requests; and generating said resource preference indication in dependence upon at least one preference indication from at least one of said selected coordination requests.

14. A method according to claim 13, wherein said monitored coordination requests are selected as being relevant monitored coordination requests in dependence upon an identifier within said request, said identifier of relevant coordination requests indicating that said relevant coordination requests are directed to a same destination as said coordination request being generated.

15. A method according to claim 13, wherein at least some of said monitored coordination requests include an indication of a characteristic of data to be transmitted in said inter user equipment direct transmissions, said relevant monitored coordination requests comprise coordination requests with similar data characteristics to said data characteristics of said coordination request being generated.

* * * * *